United States Patent Office 2,930,806
Patented Mar. 29, 1960

2,930,806

PROCESS OF MAKING THE 3,20-DISEMICARBAZONE OF CORTISONE ACETATE

Robert Joly, Montmorency, Gerard Nomine, Noisy-le-Sec, and Jean Jolly, Fontenay-sous-Bois, France, assignors to Les Laboratoires Français de Chimiotherapie, Paris, France, a body corporate of France No Drawing. Application April 13, 1955
Serial No. 501,174

Claims priority, application France July 29, 1954

1 Claim. (Cl. 260—397.45)

The present invention relates to a new derivative of cortisone and more particularly to the 3,20-disemicarbazone of cortisone acetate, and to a process of making same.

It is known to produce the acetate of hydrocortisone (11β,17α,21-trihydroxy - Δ⁴ - pregnene-3,20-dione) by reducing the 3,20-disemicarbazone of free cortisone by means of lithium borohydride to the corresponding compound having a hydroxyl group in 11β-position. Acetylating said compound in 21-position and subjecting the resulting acetoxy compound to an exchange reaction with pyruvic acid yields the 21-acetate of hydrocortisone.

Free cortisone serving as starting material in said known synthesis is usually prepared from cortisone acetate. Said compound, generally, is obtained by splitting off hydrogen bromide from the 21-acetate of 17α,21-dihydroxy-4-bromo pregnane-3,11,20-trione of the following Formula II, whereby the monosemicarbazone of Formula III is employed as intermediate product:

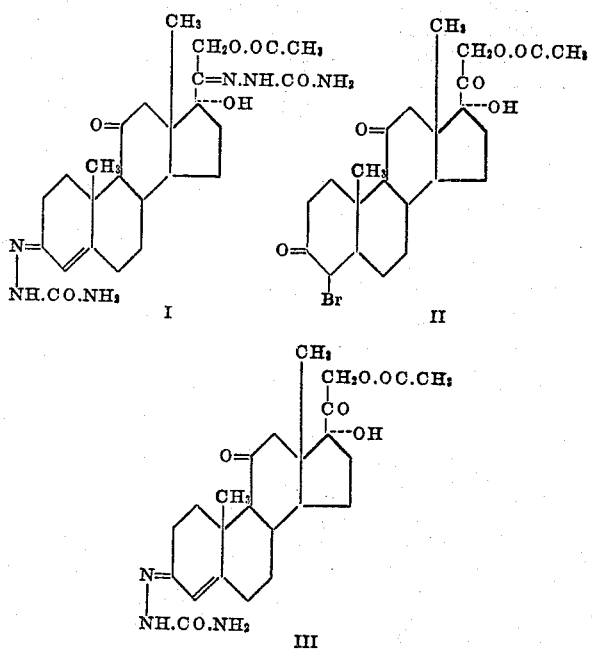

Direct formation of the 3,20-disemicarbazone of Formula I from the bromo ketone of Formula II would be of considerable importance because it would permit elimination of three steps in the synthesis of hydrocortisone.

The bromo ketone of Formula II and cortisone acetate were believed to yield exclusively the monosemicarbazone of Formula III, even under very favorable reaction conditions and in the presence of an excess of the reagent. This result was attributed to steric hindrance at the 20-carbonyl group in virtue of a neighboring ester function at position 21. Preparation of said monosemicarbazone was effected in acetic acid solution at a temperature of 70–75° C.

It is one object of the present invention to provide a simple and effective process of directly preparing the 3,20-disemicarbazone of cortisone acetate corresponding to Formula I by starting with the bromo ketone of Formula II.

Another object of the present invention is to provide a new and valuable compound, the 3,20-disemicarbazone of cortisone acetate which new compound is a valuable intermediate in the synthesis of hydrocortisone and permits the production of said compound in a more economical manner than heretofore possible.

Other objects of the present invention and advantageous features thereof will become apparent as the description proceeds.

In principle, the process according to the present invention comprises the reaction of about 5 mols of semicarbazide hydrochloride in acetic acid solution with the bromo ketone of Formula II. In contrast to the heretofore employed mode of operation, the reaction is carried out in the presence of disodium phosphate, care being taken that the temperature does not substantially exceed 50° C. In view of the teachings of the prior art, it is completely unexpected and quite surprising that the disemicarbazone is formed thereby.

It is, of course, also possible to produce the disemicarbazone of cortisone acetate by using cortisone acetate as starting material and subjecting it to the action of semicarbazide under the same reaction conditions as stated herein.

The following examples serve to illustrate the present invention without, however, limiting the same thereto.

EXAMPLE 1

*Preparation of the 3,20-disemicarbazone of cortisone acetate of Formula I by using the bromoketone of Formula II as starting material*

160 cc. of acetic acid containing 1.5% of water are heated to a temperature below 50° C. The heated acetic acid is agitated while passing a current of nitrogen therethrough. 20 g. of 4-bromo-17α-hydroxy-21-acetoxy pregnane-3,11,20-trione, 22.4 g. of semicarbazide hydrochloride, and 50 g. of disodium phosphate are introduced into said heated acetic acid. The reaction mixture is kept in said heated condition for about 4 hours and is then poured into 1500 cc. of lukewarm water. The aqueous mixture is cooled in a refrigerator, the precipitated crystals are filtered off, washed, dried, and recrystallized from ethoxy ethanol. Thereby, 14–15 g. of the pure disemicarbazone are obtained. The yield amounts to 65–70% of the theoretical yield. The pure disemicarbazone decomposes on heating above 240° C. Its rotatory power $[\alpha]_D = +198° \pm 3°$ (concentration: 1% in pyridine): $\lambda_{max} = 269$ m$\mu$, $\epsilon_{max} = 32,400$ (ethanol).

The resulting compound is identical with the compound which is obtained by acetylation of the 3,20-disemicarbazone of free cortisone.

*Analysis.*—(Molecular weight: 516.6). Calculated for $C_{25}H_{36}O_6N_6$: 58.1% C; 7.0% H; 16.3% N. Found: 58.0% C; 7.2% H; 16.2% N.

EXAMPLE 2

*Preparation of the 3,20-disemicarbazone of cortisone acetate of Formula I by using cortisone acetate as starting material*

16 g. of cortisone acetate are treated with 20 g. of semicarbazide hydrochloride and 45 g. of disodium phosphate in 150 cc. of acetic acid containing 1.5% of water under the conditions as described in Example 1. Thereby the same 3,20-disemicarbazone of cortisone acetate of Formula I is obtained as when starting with the bromo ketone of Formula II. The characteristics of said compounds are identical.

EXAMPLE 3

*Preparation of 3,20-disemicarbazone of cortisone acetate of Formula I by using the 3,20-disemicarbazone of cortisone as starting material*

In order to prove that the two compounds obtained according to the preceding examples by starting from the bromo ketone of Formula II or from cortisone acetate, respectively, are identical, the disemicarbazone I is prepared by acetylation of cortisone disemicarbazone. 10 g. of 3,20-disemicarbazone of cortisone are added to 30 cc. of pyridine. The mixture is heated to a temperature of 80–90° C. while stirring. 20 cc. of acetic acid anhydride are added thereto. The reaction mixture is stirred for 15 minutes and then poured into ice water. The aqueous mixture is cooled while stirring. In this manner the 3,20-disemicarbazone of cortisone acetate identical with the compounds prepared according to the preceding examples is obtained.

In place of disodium phosphate used in the preceding examples there can be employed equimolecular amounts of other buffer compounds and especially of sodium acetate and potassium acetate, while, otherwise, the procedure is the same as described in said examples.

In place of 5 mols used in the examples, there can be employed any amounts of semicarbazide hydrochloride comprised between 2 and 5 mols, the yields being however lower.

It is advisable to add a small percentage of water to the glacial acetic used as solvent in this reaction.

The 4-bromo-17α-hydroxy-21-acetoxy pregnane-3,11,20-trione of Formula II serving as starting material in Example 1 is prepared according to the process described in copending application Serial No. 360,870. Said process consists in heating a mixture of 17α-hydroxy-21-acetoxy-pregnane-3,11,20-trione, N-bromo succinimide and an oxidizable alcohol such as benzyl alcohol in the presence of an organic solvent capable of dissolving the keto steroid as well as N-bromo succinimide, and water to a temperature between about 50° C. and about 70° C. whereby about 1 mol of the keto steroid compound, about 2 mols of N-bromo succinimide, and at least about 1 mol of the oxidizable alcohol are employed.

As stated hereinbefore, the new compound has the great advantage that it permits the preparation of hydrocortisone in a more economical manner and with fewer reaction steps than heretofore possible.

The disemicarbazone I is therefore reduced by means of lithium borohydride to the disemicarbazone of hydrocortisone which is subjected to an exchange reaction with pyruvic acid in order to yield directly hydrocortisone.

We claim:

In a process of preparing the 3,20-disemicarbazone of cortisone acetate, the steps comprising heating 17α-hydroxy-21-acetoxy-4-bromo pregnane-3,11,20-trione at a temperature not exceeding 50° C. in acetic acid containing about 1.5% of water in a nitrogen atmosphere with about 5 mols of semicarbazide hydrochloride and with the addition of disodium phosphate as buffer compound and separating the resulting disemicarbazone from the reaction mixture.

References Cited in the file of this patent

UNITED STATES PATENTS

| | | |
|---|---|---|
| 2,590,993 | McGuckin | Apr. 1, 1952 |
| 2,628,966 | Graber et al. | Feb. 17, 1953 |
| 2,778,842 | Fonken | Jan. 22, 1957 |
| 2,781,367 | Day | Feb. 12, 1957 |

OTHER REFERENCES

Fieser et al.: (1) Organic Chemistry, 2nd edition, pages 213–214 (1950).

Shriner et al.: The Systematic Identification of Organic Compounds, 3rd edition, pages 8, 9, 201, 262–265 (1948).

Fieser et al.: (2) Natural Products Related to Phenanthrene, 3rd edition, page 407 (1949), and page 655 (1949).